Patented Sept. 4, 1945

2,384,369

UNITED STATES PATENT OFFICE 2,384,369

REACTION PRODUCTS OF AN ALDEHYDE AND A TRIAZOLE DERIVATIVE

Gaetano F. D'Alelio, Pittsfield, Mass., assignor to General Electric Company, a corporation of New York No Drawing. Application December 26, 1942, Serial No. 470,219

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxy-aldehydes and aldehyde-addition products, e. g., formaldehyde, paraformaldehyde, aldol, glucose, dimethylol urea, trimethylol melamine, etc., and a triazole derivative corresponding to the following general formula:

I 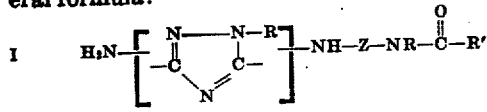

In the above formula R represents a member of the class consisting of hydrogen and monovalent hydrocarbon radicals, R' represents a monovalent hydrocarbon radical, and Z represents a member of the class consisting of divalent aromatic and nuclearly substituted, more particularly nuclearly halogenated, aromatic hydrocarbon radicals. Instead of the derivatives of the 1,2,4-triazoles represented by the above formula, corresponding derivatives of the 1,2,3-triazoles, the 1,2,5-triazoles or of the 1,3,4-triazoles may be employed.

Illustrative examples of monovalent hydrocarbon radicals that R and R' in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); and aryl-substituted aliphatic (e. g., benzyl, cinnamyl, phenylethyl, phenylpropyl, etc.). Preferably R represents hydrogen, in which case the compounds correspond to the following general formula:

II 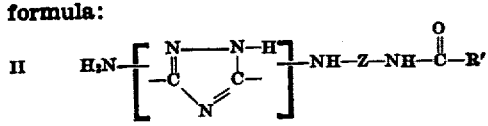

where Z and R' have the same meanings as given above with reference to Formula I. However, there also may be used in practicing the present invention chemical compounds corresponding to the following general formulas:

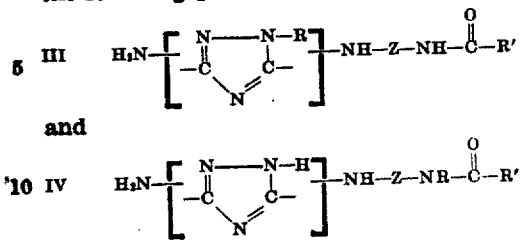

where R, R' and Z have the same meanings as given above with reference to Formula I.

Illustrative examples of divalent radicals that Z in the above formulas may represent are: divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, 1,4-dimethyl 2,3-phenylene, etc.; radicals that may be classed either as divalent aliphatic-substituted aromatic or as divalent aromatic-substituted aliphatic and wherein the free bond of the aromatic nucleus is attached to the acylamino radical, e. g., 4,alpha-tolylene, 3,beta-phenyleneethyl, 4,alpha - xylylene, 2,gamma - phenylenebutyl, etc.; and their homologues, as well as those divalent radicals with one or more of their nuclear hydrogen atoms replaced by a substituent, e. g., acyl, alkyl, alkenyl, hydroxy, alkoxy, aryloxy, carboalkoxy, carboaryloxy, sulfamyl, an acylamino $$\left(-NR-\overset{O}{\overset{\|}{C}}-R'\right)$$

grouping in addition to the single acylamino grouping shown, for example, in Formula I, etc. Specific examples of substituted divalent radicals that Z may represent are chlorophenylene, bromophenylene, chloroxenylene, chloronaphthylene, chlorotolylene, bromotolylene, ethoxyphenylene, acetophenylene, acetoxyphenylene, aminophenylene, carboethoxyphenylene, sulfamylphenylene, carbophenoxyphenylene, hydroxyphenylene, phenoxyphenylene, methylphenylene (tolylene), allylphenylene, etc. Preferably Z is phenylene or tolylene.

The triazole derivatives that are employed in carrying the present invention into effect are more fully described and are specifically claimed in my copending application Serial No. 470,220, filed concurrently herewith and assigned to the same assignee as the present invention. As pointed out in this copending application, a method of preparing the triazole derivatives used in practicing the present invention comprises effecting reaction under heat between a hydrazine corresponding to the general formula NH₂—NHR, where R has the same meaning as given above with reference to Formula I, and an acylaminoaryl biguanide corresponding to the general formula

where R, R' and Z have the same meanings as given above with reference to Formula I. The reaction is carried out under conditions such as will result in the formation of ammonia, or, if an acid is present, an ammonium salt as a by-product of the reaction.

The specific examples of compounds embraced by Formula I that may be used in practicing my invention are listed below:

The (acetamido anilino) amino 1,2,4-triazoles, including 3-(ortho-acetamido anilino) 5-amino 1,2,4-triazole; 3-amino 5-(ortho-acetamido anilino) 1,2,4-triazole; 3-(meta-acetamido anilino) 5-amino 1,2,4-triazole; 3-amino 5-(meta-acetamido anilino) 1,2,4-triazole; 3-(para-acetamido anilino) 5-amino 1,2,4-triazole; and 3-amino 5-(para-acetamido anilino) 1,2,4-triazole
1-methyl 3-(ortho-acetamido anilino) 5-amino 1,2,4-triazole
1-methyl 3-amino 5-(ortho-acetamido anilino) 1,2,4-triazole
1-methyl 3-(meta-acetamido anilino) 5-amino 1,2,4-triazole
1-methyl 3-amino 5-(meta-acetamido anilino) 1,2,4-triazole
1-methyl 3-(para-acetamido anilino) 5-amino 1,2,4-triazole
1-methyl 3-amino 5-(para-acetamido anilino) 1,2,4-triazole
1-phenyl 3-(ortho-acetamido anilino) 5-amino 1,2,4-triazole
1-phenyl 3-amino 5-(ortho-acetamido anilino) 1,2,4-triazole
1-phenyl 3-(meta-acetamido anilino) 5-amino 1,2,4-triazole
1-phenyl 3-amino 5-(meta-acetamido anilino) 1,2,4-triazole
1-phenyl 3-(para-acetamido anilino) 5-amino 1,2,4-triazole
1-phenyl 3-amino 5-(para-acetamido anilino) 1,2,4-triazole
(Para-propanamido anilino) amino 1,2,4-triazoles
[(N-methyl acetamido) anilino] amino 1,2,4-triazoles
[(N - isobutyl benzamido) xyenylamino] amino 1,2,4-triazoles
[(N-phenyl benzamido) anilino] amino 1,2,4-triazoles
[(N-cyclopentyl acetamido) anilino] amino 1,2,4-triazoles
[(N-tolyl acetamido) toluido] amino 1,2,4-triazoles
1-ethyl 3-(ortho-acetamido anilino) 5-amino 1,2,4-triazole
1-ethyl 3-amino 5-(ortho-acetamido anilino) 1,2,4-triazole
1-ethyl 3-(meta-acetamido anilino) 5-amino 1,2,4-triazole
1-ethyl 3-amino 5-(meta-acetamido anilino) 1,2,4-triazole
1-tolyl 3-(ortho-acetamido anilino) 5-amino 1,2,4-triazole
1-tolyl 3-amino 5-(ortho-acetamido anilino) 1,2,4-triazole
1-tolyl 3-(meta-acetamido anilino) 5-amino 1,2,4-triazole
1-tolyl 3-amino 5-(meta-acetamido anilino) 1,2,4-triazole
(Ortho-propanamido anilino) amino 1,2,4-triazoles
(Meta-propanamido anilino) amino 1,2,4-triazoles
(Acetamido toluido) amino 1,2,4-triazoles
1-butyl (acetamido anilino) amino 1,2,4-triazoles
1-methyl (acetamido toluido) amino 1,2,4-triazoles
1-phenyl (acetamido toluido) amino 1,2,4-triazoles
(Propanamido toluido) amino 1,2,4-triazoles
(Butanamido toluido) amino 1,2,4-triazoles
(Isobutanamido xylidino) amino 1,2,4-triazoles
(Propenamido naphthylamino) amino 1,2,4-triazoles
(Cyclopentanamido xenylamino) amino 1,2,4-triazoles
(Benzamido anilino) amino 1,2,4-triazoles
(Hexahydrobenzamido anilino) amino 1,2,4-triazoles
(Benzamido toluido) amino 1,2,4-triazoles
(Toluamido anilino) amino 1,2,4-triazoles
(Toluamido toluido) amino 1,2,4-triazoles
(Acetamido ethyl anilino) amino 1,2,4-triazoles
(Benzamido methyl naphthylamino) amino 1,2,4-triazoles
(Dimethylbenzamido fluoro anilino) amino 1,2,4-triazoles
(Naphthamido anilino) amino 1,2,4-triazoles
1-propyl (acetamido toluido) amino 1,2,4-triazoles
1-isobutyl (benzamido anilino) amino 1,2,4-triazoles
1-propenyl (benzamido anilino) amino 1,2,4-triazoles
1-cyclopentyl (acetamido anilino) amino 1,2,4-triazoles
1-phenyl (methylbenzamido xylidino) amino 1,2,4-triazoles
1-methyl [(N-methyl acetamido) anilino] amino 1,2,4-triazoles
1-benzyl [(N-ethyl acetamido) anilino] amino 1,2,4-triazoles
(Acetamido chloro anilino) amino 1,2,4-triazoles
(Acetamido bromo anilino) amino 1,2,4-triazoles
(Propanamido iodo toluido) amino 1,2,4-triazoles
(Butanamido fluoro toluido) amino 1,2,4-triazoles
1-phenethyl (acetamido anilino) amino 1,2,4-triazoles
1-ethylphenyl (acetamido anilino) amino 1,2,4-triazoles
[(N-phenyl acetamido) anilino] amino 1,2,4-triazoles
[(N-ethyl propanamido) anilino] amino 1,2,4-triazoles
[(N-propyl butanamido) toluido] amino 1,2,4-triazoles
1-methyl [(N-allyl acetamido) anilino] amino 1,2,4-triazoles
1-methyl [(N-methyl acetamido) naphthylamino] amino 1,2,4-triazoles
1-phenyl [(N-phenyl acetamido) anilino] amino 1,2,4-triazoles
1-tolyl [(N-benzyl acetamido) propyl anilino] amino 1,2,4-triazoles
1-ethyl [(N-phenethyl acetamido) toluido] amino 1,2,4-triazoles
1-allyl (acetamido anilino) amino 1,2,4-triazoles It will be understood, of course, by those skilled in the art that, in those compounds listed above which are generically named, the amino grouping may be attached to either the 3 or the 5 carbon atoms of the triazole nucleus, the carbon atom which is not joined to an amino grouping being attached to the acylaminoarylamino grouping; and, also, that the acylamino grouping may be attached to any of the reactive carbon atoms of the aromatic nucleus.

The present invention is based on my discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazole derivative of the kind embraced by Formula I, numerous examples of which have been given above and in my copending application Serial No. 470,220.

Resins made by condensing an aldehyde with guanazole (3,5-diamino 1,2,4-triazole) and 1-substituted guanazoles, e. g., 1-phenyl guanazole, are not entirely satisfactory for use in many applications, for instance in the production of molding compounds having a high plastic flow combined with a rapid cure under heat to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and, in most most cases, a better resistance to water than the ordinary urea-aldehyde resins. The cured resins have a high resistance to heat and abrasion. Hence they are especially suitable for use where optimum heat- and abrasion-resistance are of primary importance.

In practicing my invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are organic and inorganic acids such as hydrochloric, sulfuric, phosphoric, acetic, lactic, acrylic, malonic, etc., and acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazole derivative may be carried out in the presence or absence of solvents or diluents, fillers, other natural or synthetic resinous bodies or while admixed with other materials that also can react with the aldehydic reactant or with the triazole derivative, e. g., ketones, urea, thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940, now Patent No. 2,322,566, issued June 22, 1943; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, the monoamide, diamide and triamide of tricarballylic acid, etc.; aminotriazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and numerous other phenols such as mentioned in my Patent No. 2,239,441, issued April 22, 1941; monohydric and polyhydric alcohols, e. g., butyl alcohol, amyl alcohol, isoamyl alcohol, heptyl alcohol, octyl alcohol, 2-ethylbutyl alcohol, ethylene glycol, glycerine, polyvinyl alcohol, etc.; amines, including aromatic amines, e. g., aniline, etc.; and the like.

The modifying reactants may be incorporated with the triazole derivative and the aldehyde by mixing all the reactants and effecting condensation therebetween or by various permutations of reactants as described, for example, in my Patent No. 2,281,559, issued May 5, 1942 (page 2, column 1, lines 46–49), with particular reference to reactants involving a non-haloacylated urea, a haloacylated urea and an aliphatic aldehyde. For instance, I may form a partial condensation product of ingredients comprising (1) urea or melamine or urea and melamine, (2) a triazole derivative of the kind embraced by Formula I, e. g., an (acetamido anilino) amino 1,2,4-triazole [(ortha-, meta- or para-acetamido anilino) amino 1,2,4-triazole], which also may be named (acetamido phenylamino) amino 1,2,4-triazole and which includes within its meaning 3-(ortho-, meta- or para-acetamido anilino) 5-amino 1,2,4-triazole and 3-amino 5-(ortho-, meta- or para-acetamido anilino) 1,2,4-triazole, a 1-alkyl (acetamido anilino) amino 1,2,4-triazole, a 1-aryl (acetamido anilino) amino 1,2,4-triazole, etc., and (3) an aldehyde, including polymeric aldehydes, hydroxyaldehydes and aldehyde-addition products, for instance formaldehyde, paraformaldehyde, glyceraldehyde, dimethylol urea, a polymethylol aminotriazine, e. g., trimethylol melamine, hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermosetting or potentially thermosetting resinous condensation products, alone or mixed with fillers, pigments, lubricants, plasticizers, curing agents, etc., may be used, for example, in the production of molding compositions. The thermoplastic condensation products are of particular value as plasticizers for other synthetic resins.

The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing plywood (bonded sheets of wood veneer) and other laminated structures, and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| (Para-acetamido anilino) amino 1,2,4-triazole | 232 |
| Aqueous formaldehyde (approx. 37.1% HCHO) | 243 |
| Aqueous ammonia (approx. 28% NH₃) | 30 |
| Sodium hydroxide in 50 parts water | 1 | were heated together under reflux at the boiling temperature of the mass for 30 minutes, yielding a resinous syrup. A thermosetting resin was obtained by incorporating chloroacetamide (monochloroacetamide), glycine, sulfamic acid or other curing agent such as hereafter mentioned either into the initial syrupy condensation product or into the dehydrated syrup.

To 115 parts of the syrup prepared as above described was added 0.5 part sulfamic acid, after which the mixture was heated under reflux at boiling temperature for 5 minutes. The resulting hot, resinous syrup was mixed with 35 parts alpha-cellulose in flock form and 0.2 part of a mold lubricant, specifically zinc stearate, to form a molding (moldable) composition. The wet molding compound was dried at 65° C. for two hours. A sample of the dried and ground molding composition was molded for 5 minutes at 130° C. under a pressure of 2,000 pounds per square inch. The molded piece was strong and well cured throughout and had a well-knit and homogeneous structure. The plasticity of the molding compound during molding was very good.

Instead of using sulfamic acid in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than sulfamic acid (e. g., chloroacetamides, including the mono-, di- and tri-chloroacetamides, chloroacetonitriles, alpha, beta-dibromopropionitrile, aminoacetamide hydrochloride, ethylene diamine hydrochloride, the ethanolamine hydrochlorides, nitrourea, chloroacetyl urea, chloroacetone, citric diamide, phenacyl chloride, etc.). Other examples of curing reactants that may be employed to accelerate or to effect the curing of the thermosetting or potentially thermosetting resins of this and other examples are given in various copending applications of mine, for instance in my copending application Serial No. 346,962, filed July 23, 1940, now Patent No. 2,325,375, and Serial No. 354,395, filed August 27, 1940, now Patent No. 2,325,376, both of which applications issued as patents on July 27, 1943, and are assigned to the same assignee as the present invention.

*Example 2*

| | Parts |
|---|---|
| (Para-acetamido anilino) amino 1,2,4-triazole | 46.4 |
| Urea | 48.0 |
| Aqueous formaldehyde (approx. 37.1% HCHO) | 162.0 |
| Aqueous ammonia (approx. 28% NH₃) | 10.0 |
| Sodium hydroxide in 5 parts water | 0.1 | were heated together under reflux at boiling temperature for 15 minutes, yielding a gel. When a sample of this gel was heated on a 140° C. hot plate, it bodied to a thermoelastic resin. This resin was potentially heat-curable as shown by the fact that when a small amount of a curing agent was incorporated either into the gel or into the thermoelastic resin, followed by heating on a 140° C. hot plate, the material was converted into an insoluble and infusible state.

After mixing 1 part chloroacetamide (monochloroacetamide) with 115 parts of the initial condensation product, the resulting mixture was refluxed for 5 minutes. A molding composition was prepared from the chloroacetamide-modified syrup in the same manner as described under Example 1 with reference to the sulfamic acid-modified syrup of that example with the exception that the time of drying at 65° C. was only 1 hour. A well-molded piece having good strength and an attractive surface appearance was obtained by molding a sample of the dried and ground molding compound for 5 minutes at 130° C. under a pressure of 2,000 pounds per square inch. The molding composition showed good plasticity during molding.

*Example 3*

| | Parts |
|---|---|
| (Para-acetamido anilino) amino 1,2,4-triazole | 232 |
| Para-toluene sulfonamide | 171 |
| Aqueous formaldehyde (approx. 37.1% HCHO) | 324 |
| Sodium hydroxide in 50 parts water | 1 | were heated together under reflux at the boiling temperature of the mass for 30 minutes, yielding a clear syrup. The incorporation of a small amount of a curing agent, e. g., chloroacetamide, glycine, sulfamic acid, nitrourea, etc., into this syrup, followed by heating on a 140° C. hot plate, caused the syrup to convert into an insoluble and infusible or cured resin.

To 115 parts of the syrup produced as above described was added 0.5 part sulfamic acid, after which the mixture was refluxed for 5 minutes. A molding composition was prepared from this syrup as described under Example 1 with the exception that the wet molding compound was dried for 1 hour at 64° C. A sample of the dried and ground molding composition was molded for 5 minutes at 130° C. under a pressure of 2,000 pounds per square inch. The molded piece was well cured throughout and had a well-knit and homogeneous structure. The molding compound showed excellent plastic flow during molding as evidenced by the amount of flash on the molded article.

Example 4

| | Parts |
|---|---|
| Synthetic phenol | 45.0 |
| Aqueous formaldehyde (approx. 37.1% HCHO) | 97.5 |
| Potassium carbonate | 1.43 |
| (Para-acetamido anilino) amino 1,2,4-triazole | 4.5 |

A liquid phenol-formaldehyde partial condensation product was prepared by heating together all of the above ingredients with the exception of the triazole derivative under reflux for 3½ hours at 65° to 70° C. The above-stated amount of (para-acetamido anilino) amino 1,2,4-triazole was added to this syrupy phenolic resin and heating under reflux was continued for 1½ hours. At the end of this reaction period the resulting syrupy intercondensation product was acidified by adding thereto 3 parts oxalic acid dissolved in 50 parts water. A molding compound was made from the acidified syrup by mixing therewith 57 parts alpha-cellulose and 0.6 part zinc stearate. The wet molding composition was dried for 2 hours at 65° C. A well-cured, light-colored molded piece having good water resistance was obtained by molding a sample of the dried and ground molding composition for 5 minutes at 130° C. under a pressure of 2,000 pounds per square inch. Satisfactory plastic flow during molding was indicated by the amount of flash on the molded article.

Example 5

| | Parts |
|---|---|
| (Para-acetamido anilino) amino 1,2,4-triazole | 23.2 |
| Furfural | 28.8 |
| Aqueous ammonia (approx. 28% NH₃) | 2.0 |
| Sodium hydroxide in 5 parts water | 0.1 |
| Water | 50.0 | were heated together under reflux at the boiling temperature of the mass for 30 minutes, yielding a very viscous, resinous mass. This resin cured to an insoluble and infusible state in the absence of a curing agent when a small sample of it was heated on a 140° C. hot plate. The curing of the resin was accelerated by incorporating glycine, citric acid, chloroacetamide or other curing agent such as mentioned under Example 1 into the heat-curable resin prior to heating on the hot plate. The resinous composition of this example, especially after modification with a curing agent, may be used in the production of molding compounds.

Example 6

| | Parts |
|---|---|
| (Para-acetamido anilino) amino 1,2,4-triazole | 23.2 |
| Acrolein | 16.8 |
| Sodium hydroxide in 5 parts water | 0.1 |
| Water | 50.0 | were heated together under reflux at boiling temperature for 15 minutes, yielding a water-insoluble resin having curing characteristics much the same as the resin of Example 5. As in the case of the resin of Example 5, the resinous composition of this example likewise is suitable for use in the preparation of molding compounds.

Example 7

| | Parts |
|---|---|
| (Para-acetamido anilino) amino 1,2,4-triazole | 23.2 |
| Butyl alcohol | 74.0 |
| Aqueous formaldehyde (approx. 37.1% HCHO) | 64.8 |
| Sodium hydroxide in 5 parts water | 0.1 |

The above ingredients were heated together under reflux at the boiling temperature of the mass for 30 minutes, yielding a clear, syrupy condensation product. This syrup bodied to a thermoplastic resin when a sample of it was heated on a 140° C. hot plate. This resin was potentially heat-curable as shown by the fact that when sulfamic acid, citric acid, chloral urea, glycine, phenacyl chloride, chloroacetamide, nitrourea or other curing agent such as mentioned under Example 1 was added either to the syrupy condensation product or to the thermoplastic resin, followed by heating on a 140° C. hot plate, the material cured to an insoluble and infusible state. The dehydrated resin was alcohol-soluble. The cured resin displayed marked resistance to water, alcohols, etc. The resinous composition of this example is especially suitable for use in the preparation of liquid coating and impregnating materials.

Example 8

| | Parts |
|---|---|
| (Para-acetamido anilino) amino 1,2,4-triazole | 23.2 |
| Acetamide | 5.9 |
| Aqueous formaldehyde (approx. 37.1% HCHO) | 40.5 |
| Aqueous ammonia (approx. 28% NH₃) | 3.0 |
| Sodium hydroxide in 5 parts water | 0.1 | were heated together under reflux at the boiling temperature of the mass for 30 minutes, yielding a clear, viscous syrup that bodied to a thermoplastic resin when a sample of it was heated on a 140° C. hot plate. This resin was potentially heat-curable as shown by the fact that the addition of a small amount of sulfamic acid, citric acid, oxalic acid, chloroacetamide, glycine or other curing agent such as mentioned under Example 1 to the initial syrup or to the thermoplastic resin, followed by heating on a 140° C. hot plate, caused the material to convert to a cured or insoluble and infusible state. The excellent plastic flow of the resin during curing indicated that it would be particularly suitable for use as a plasticizer of less plastic aminoplasts and other compatible resins to improve their plasticity or flow characteristics. For example, it may be used as a modifier of urea-aldehyde resins, melamine-aldehyde resins, aniline-aldehyde resins, etc., the flow characteristics of which are unsatisfactory during curing, to improve the plasticity thereof.

*Example 9*

| | Parts |
|---|---|
| (Para-acetamido anilino) amino 1,2,4-triazole | 23.2 |
| Glycerine | 9.2 |
| Aqueous formaldehyde (approx. 37.1% HCHO) | 48.6 |
| Aqueous ammonia (approx. 28% NH₃) | 3.0 |
| Sodium hydroxide in 5 parts water | 0.1 | were heated together under reflux at boiling temperature for 30 minutes, yielding a syrupy condensation product that bodied to a thermoplastic resin when a small sample of it was heated on a 140° C. hot plate. Heat-curable resins are prepared by incorporating chloroacetamide, glycine or other curing agent such as mentioned under Example 1 into the initial syrup or into the thermoplastic resin. The resinous material of this example may be employed in the preparation of various varnish compositions. Because of its inherent plasticizing characteristics, it also may be used as a flow extender for other compatible aminoplasts and other synthetic resins having unsatisfactory flow characteristics.

*Example 10*

| | Parts |
|---|---|
| (Para-acetamido anilino) amino 1,2,4-triazole | 23.2 |
| Polyvinyl alcohol | 26.4 |
| Aqueous formaldehyde (approx. 37.1% HCHO) | 64.8 |
| Sodium hydroxide in 5 parts of water | 0.1 |
| Water | 100.0 |

The above ingredients were heated together under reflux at boiling temperature for 30 minutes. When a sample of the resulting syrupy condensation product was heated on a 140–150° C. hot plate, it bodied to thermoelastic resin. The pH of the syrup was lowered by adding thereto a small amount of an acid, specifically hydrochloric acid. The acidified syrup was thermosetting, as evidenced by the fact that it cured to an insoluble and infusible state when a small sample of it was heated in film form at 70° to 80 C. for several hours. The baked film was hard and tough, and showed good resistance to water. Instead of hydrochloric acid, other curing agents such as mentioned under Example 1 may be employed to improve the curing characteristics and the water resistance of the resinous material of this example. The thermoplastic resinous product, either with or without a curing agent, may be used in the preparation of various liquid coating and impregnating compositions. The thermosetting resins may be employed in the production of molding compounds.

*Example 11*

| | Parts |
|---|---|
| (Para-acetamido anilino) amino 1,2,4-triazole | 23.2 |
| Diethyl malonate | 16.0 |
| Aqueous formaldehyde (approx. 37.1% HCHO) | 40.5 |
| Aqueous ammonia (approx. 28% NH₃) | 3.0 |
| Sodium hydroxide in 5 parts water | 0.1 |

The above ingredients were heated together under reflux at the boiling temperature of the mass for 30 minutes. When a sample of the resulting resinous syrup was heated on a 140° C. hot plate, it bodied to a thermoplastic resin. The addition of a small amount of a curing agent such as mentioned under Example 1 either to the syrupy condensation product or to the thermoplastic resin, followed by heating on a 140° C. hot plate, caused the material to cure to an infusible, insoluble resin. The resinous mass exhibited a long period of flow during curing, indicating that the resin of this example would be particularly adapted for use as a flow extended for other compatible aminoplast resins.

It will be understood, of course, by those skilled in the art that the reaction between the aldehyde and the triazole derivative may be effected at temperatures ranging, for example, from room temperature to the fusion or boiling temperature of the mixed reactants or of solutions of the mixed reactants, the reaction proceeding more slowly at normal temperature than at elevated temperatures in accordance with the general law of chemical reactions. Thus, instead of effecting reaction between the ingredients of the above examples under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific triazole derivative embraced by Formula I that is named in the above illustrative examples. Thus, instead of a (para-acetamido anilino) amino 1,2,4-triazole I may use, for example, an (ortho-acetamido anilino) amino 1,2,4-triazole, more particularly 3-(ortho-acetamido anilino) 5-amino 1,2,4-triazole or 3-amino 5-(ortho-acetamido anilino) 1,2,4-triazole, a (meta-acetamido anilino) amino 1,2,4-triazole, specifically 3-(meta-acetamido anilino) 5-amino 1,2,4-triazole or 3-amino 5-(meta-acetamido anilino) 1,2,4-triazole, a (propanamido anilino) amino 1,2,4-triazole, an (acetamido toluido) amino 1,2,4-triazole, an (acetamido xylidino) amino 1,2,4-triazole, a 1-alkyl (e. g., 1-methyl, 1-ethyl, etc.) (acetamido anilino) amino 1,2,4-triazole, a 1-aryl (e. g., 1-phenyl, 1-tolyl, etc.) (acetamido anilino) amino 1,2,4-triazole, or any other triazole derivative (or mixture thereof) of the kind embraced by Formula I, numerous examples of which have been given hereinbefore and in my copending application Serial No. 470,220.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, isobutyraldehyde, pentaldehyde, heptaldehyde, capraldehyde, octaldehyde, crotonaldehyde, salicylaldehyde, cinnamaldehyde, benzaldehyde, furfural, methacrolein, aldol, glucose, glyoxal, glycollic aldehyde, glyceric aldehyde, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the amino-triazines, mono- and poly-(N-carbinol) derivatives of the aminodiazines, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazole derivative may be varied over a wide range, but ordinarily the reactants are employed in an amount corresponding to at least one mol of the aldehyde, specifically formaldehyde, for each mol of the triazole derivative. Thus, I may use, for example, from 1 to 7 or 8 or more mols of an aldehyde for each mol of the triazole derivative. Good results are obtained in manufacturing thermosetting resinous compositions using from about 2 to 4 mols aldehyde, specifically formaldehyde, for each mol of the triazole derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 or 3 up to 15 or 20 or more mols of such alkylol derivative for each mol of the triazole derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as methyl, ethyl, propyl, isopropyl, isobutyl, hexyl, etc., alcohols; polyhydric alcohols such as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzamide, benzene sulfonamides, toluene sulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles; acylated ureas, including halogenated acylated ureas; and others.

The modifying bodies also make take the form of high molecular weight bodies with or without resinous characteristics, for example, hydrolyzed wood products, formalized cellulose derivatives, lignin, protein-aldehyde condensation products, aminotriazine-aldehyde condensation products (e. g., melamine-formaldehyde condensation products), aminodiazine-aldehyde condensation products, etc. Other examples of modifying bodies are the urea-aldehyde condensation products, aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazole derivative of the kind embraced by Formula I and an aldehyde specifically formaldehyde, I may cause an aldehyde to condense with a salt (organic or inorganic) of the triazole derivative or with a mixture of the triazole derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, thin sheets of wood, etc., are coated or coated and impregnated with the resin, superimposed and thereafter united under heat and pressure. They may be employed in the production of wire or baking enamels from which insulated wires and other coated products are made, for bonding or cementing together mica flakes to form a laminated mica article, for bonding together abrasive grains in the preparation of resin-bonded abrasive articles such, for instance, as grindstones, sandpapers, etc., in the manufacture of electrical resistors, etc. They may be used for treating cotton, linen and other cellulosic materials in sheet or other form. They also may be employed as impregnants for electrical coils and for other electrically insulating applications.

What I claim as new and desire to secure by Letters Patent of the United States is:

1. A composition of matter comprising the product of reaction of ingredients comprising an aldehyde and a compound corresponding to the general formula

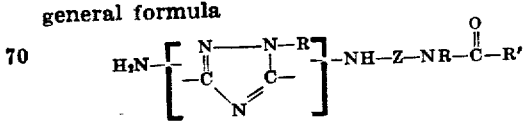

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

2. A composition of matter comprising the product of reaction of ingredients comprising formaldehyde and a compound corresponding to the general formula

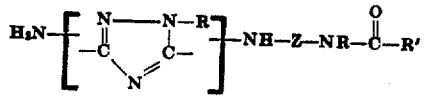

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

3. A composition of matter comprising the product of reaction of ingredients comprising an aldehyde and a compound corresponding to the general formula

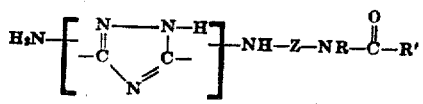

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

4. A composition of matter comprising the product of reaction of ingredients comprising an aldehyde and a compound corresponding to the general formula

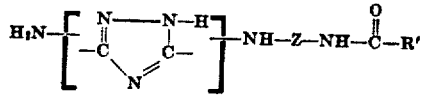

where R' represents a monovalent hydrocarbon radical and Z represents a divalent aromatic hydrocarbon radical.

5. A composition of matter comprising the product of reaction of ingredients comprising an aldehyde and a compound corresponding to the general formula

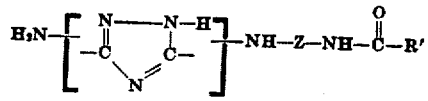

where R' represents an alkyl radical and Z represents a divalent aromatic hydrocarbon radical.

6. A composition as in claim 1 wherein the reaction product is the product obtained by effecting initial reaction between the specified components under alkaline conditions.

7. A composition as in claim 1 wherein the reaction product is an alcohol-modified reaction product of the specified components.

8. A heat-curable resinous composition comprising a heat-convertible condensation product of ingredients comprising formaldehyde and a compound corresponding to the general formula

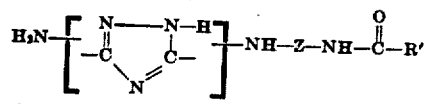

where R' represents a monovalent hydrocarbon radical and Z represents a divalent aromatic hydrocarbon radical.

9. A product comprising the cured resinous composition of claim 8.

10. A composition comprising the condensation product of ingredients comprising an aldehyde and an (acetamido anilino) amino 1,2,4-triazole.

11. A resinous composition comprising the product of reaction of ingredients comprising formaldehyde and an (acetamido anilino) amino 1,2,4-triazole.

12. A resinous composition comprising the condensation product of ingredients comprising an aldehyde and a (para-acetamido anilino) amino 1,2,4-triazole.

13. A composition comprising the product of reaction of ingredients comprising a urea, an aldehyde and a compound corresponding to the general formula

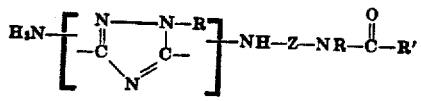

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

14. A composition comprising the resinous product of reaction of ingredients comprising urea, formaldehyde and a compound corresponding to the general formula

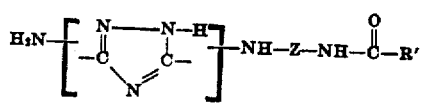

where R' represents a monovalent hydrocarbon radical and Z represents a divalent aromatic hydrocarbon radical.

15. A composition comprising the resinous product of reaction of ingredients comprising a urea, an aldehyde and an (acetamido anilino) amino 1,2,4-triazole.

16. A composition comprising the product of reaction of ingredients comprising an aminotriazine, an aldehyde and a compound corresponding to the general formula

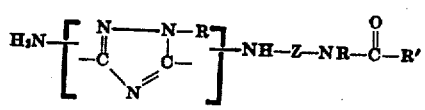

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

17. A composition comprising the resinous product of reaction of ingredients comprising melamine, formaldehyde and a compound corresponding to the general formula

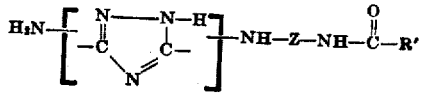

where R' represents a monovalent hydrocarbon radical and Z represents a divalent aromatic hydrocarbon radical.

18. A heat-curable composition comprising the heat-convertible resinous reaction product of (1) a partial condensation product of ingredients comprising formaldehyde and a compound corresponding to the general formula

where R' represents a monovalent hydrocarbon radical and Z represents a divalent aromatic hydrocarbon radical, and (2) a curing reactant.

19. A product comprising the cured composition of claim 18.

20. The method of preparing new synthetic compositions which comprises effecting reaction between ingredients comprising an aldehyde and a compound corresponding to the general formula

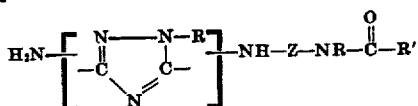

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

GAETANO F. D'ALELIO.

---

CERTIFICATE OF CORRECTION.

Patent No. 2,384,369.  September 4, 1945.

GAETANO F. D'ALELIO.

It is hereby certified that error appears in the printed specification of the above numbered patent requiring correction as follows: Page 2, first column, line 58, for "xyenylamino" read --xenylamino--; page 3, first column, line 4, for "atoms" read --atom--; line 37, strike out "most" second occurrence; page 4, first column, line 75, after "structure" insert a period; page 6, first column, line 36, after "parts" strike out --of--; line 50, for "80 C." read --80° C.--; and second column, line 10, for "extended" read --extender--; page 7, second column, line 12, after "shellac" insert a comma; line 19, after "aldehyde" insert a comma; and that the said Letters Patent should be read with this correction therein that the same may conform to the record of the case in the Patent Office.

Signed and sealed this 22nd day of January, A. D. 1946.

Leslie Frazer (Seal)  First Assistant Commissioner of Patents.

comprising formaldehyde and a compound corresponding to the general formula

where R' represents a monovalent hydrocarbon radical and Z represents a divalent aromatic hydrocarbon radical, and (2) a curing reactant.

19. A product comprising the cured composition of claim 18.

20. The method of preparing new synthetic compositions which comprises effecting reaction between ingredients comprising an aldehyde and a compound corresponding to the general formula

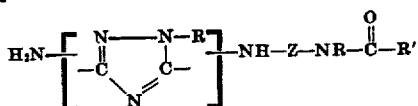

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

GAETANO F. D'ALELIO.

CERTIFICATE OF CORRECTION.

Patent No. 2,384,369. September 4, 1945.

GAETANO F. D'ALELIO.

It is hereby certified that error appears in the printed specification of the above numbered patent requiring correction as follows: Page 2, first column, line 58, for "xyenylamino" read --xenylamino--; page 3, first column, line 4, for "atoms" read --atom--; line 37, strike out "most" second occurrence; page 4, first column, line 75, after "structure" insert a period; page 6, first column, line 36, after "parts" strike out --of--; line 50, for "80 C." read --80° C.--; and second column, line 10, for "extended" read --extender--; page 7, second column, line 12, after "shellac" insert a comma; line 19, after "aldehyde" insert a comma; and that the said Letters Patent should be read with this correction therein that the same may conform to the record of the case in the Patent Office.

Signed and sealed this 22nd day of January, A. D. 1946.

Leslie Frazer (Seal) First Assistant Commissioner of Patents.